United States Patent
Karthik

(10) Patent No.: US 8,443,200 B2
(45) Date of Patent: May 14, 2013

(54) BIOMETRIC VERIFICATION FOR ELECTRONIC TRANSACTIONS OVER THE WEB

(75) Inventor: Kaleedhass Karthik, Kuala Lumpur (MY)

(73) Assignee: Karsof Systems LLC, Anaheim, CA (US)

( * ) Notice: Subject to any disclaimer, the term of this patent is extended or adjusted under 35 U.S.C. 154(b) by 869 days.

(21) Appl. No.: 11/084,245

(22) Filed: Mar. 21, 2005

(65) Prior Publication Data

US 2005/0165700 A1   Jul. 28, 2005

Related U.S. Application Data

(63) Continuation of application No. 09/893,714, filed on Jun. 29, 2001, now abandoned.

(30) Foreign Application Priority Data

Jun. 29, 2000   (MY) .................................. 2000 2960

(51) Int. Cl.
 *H04L 29/06*   (2006.01)
(52) U.S. Cl.
 USPC .......................................... 713/186; 726/27
(58) Field of Classification Search .................. 713/186; 726/27
 See application file for complete search history.

(56) References Cited

U.S. PATENT DOCUMENTS

| | | | |
|---|---|---|---|
| 4,993,068 A * | 2/1991 | Piosenka et al. ............... | 713/186 |
| 5,229,764 A | 7/1993 | Matchett et al. | |
| 5,280,527 A | 1/1994 | Gullman et al. | |
| 5,546,471 A | 8/1996 | Merjanian | |
| 5,613,012 A * | 3/1997 | Hoffman et al. ............... | 382/115 |
| 5,832,464 A | 11/1998 | Houvener et al. | |
| 5,930,804 A * | 7/1999 | Yu et al. ............................ | 1/1 |
| 5,970,143 A * | 10/1999 | Schneier et al. ............... | 713/181 |
| 6,006,328 A | 12/1999 | Drake | |
| 6,028,950 A | 2/2000 | Merjanian | |
| 6,173,400 B1 * | 1/2001 | Perlman et al. ................ | 713/172 |
| 6,182,076 B1 * | 1/2001 | Yu et al. ......................... | 713/186 |
| 6,219,439 B1 * | 4/2001 | Burger ............................ | 382/115 |
| 6,256,737 B1 * | 7/2001 | Bianco et al. .................. | 713/186 |
| 6,424,249 B1 * | 7/2002 | Houvener ..................... | 340/5.82 |

(Continued)

FOREIGN PATENT DOCUMENTS

| | | |
|---|---|---|
| EP | 0924656 A2 | 6/1999 |
| WO | WO 98/52317 A1 | 11/1998 |
| WO | WO 00/55800 A1 | 9/2000 |
| WO | WO 01/39134 A2 | 5/2001 |

*Primary Examiner* — David Cervetti
(74) *Attorney, Agent, or Firm* — Maier & Maier PLLC

(57) ABSTRACT

A security system for electronic commerce for verifying the authenticity of a user including: a server authentication program installed in a web-server at a website of a web-service provider; a client software component downloaded and installed at a workstation of the user; the server authentication program being integrated with existing web-applications with the web-service provider and for receiving existing security parameters entered by the user; a biometric scanner activated for identifying characteristics of a biometrics image and for converting the biometrics image into digital data; a device for compressing and encrypting the digital data from the biometric scanner; a device for transmitting the compressed and encrypted data to the web-server; a device for comparing the encrypted data with data stored in a database; and a device for sending status codes of comparison, if comparison is successful, to the web-service provider.

8 Claims, 13 Drawing Sheets

U.S. PATENT DOCUMENTS

| | | | |
|---|---|---|---|
| 6,686,546 B2* | 2/2004 | Chiu | 178/18.01 |
| 6,690,673 B1* | 2/2004 | Jarvis | 370/401 |
| 6,871,287 B1* | 3/2005 | Ellingson | 726/9 |
| 7,020,308 B1* | 3/2006 | Shinzaki et al. | 382/124 |
| 7,039,221 B1* | 5/2006 | Tumey et al. | 382/118 |
| 7,046,280 B1* | 5/2006 | Niikawa | 348/231.9 |
| 7,152,783 B2* | 12/2006 | Charrin | 235/379 |
| 7,404,086 B2* | 7/2008 | Sands et al. | 713/186 |
| 7,409,543 B1* | 8/2008 | Bjorn | 713/155 |
| 7,698,565 B1* | 4/2010 | Bjorn et al. | 713/186 |
| 7,895,432 B2* | 2/2011 | Bjorn | 713/155 |
| 7,974,448 B2* | 7/2011 | Shinzaki et al. | 382/124 |
| 8,185,646 B2* | 5/2012 | Headley | 709/229 |
| 2001/0000045 A1* | 3/2001 | Yu et al. | 707/9 |
| 2001/0036301 A1* | 11/2001 | Yamaguchi et al. | 382/125 |
| 2001/0044906 A1* | 11/2001 | Kanevsky et al. | 713/202 |
| 2001/0048025 A1* | 12/2001 | Shinn | 235/382 |
| 2002/0010857 A1* | 1/2002 | Karthik | 713/168 |
| 2002/0142844 A1* | 10/2002 | Kerr | 463/42 |
| 2002/0145051 A1* | 10/2002 | Charrin | 235/492 |
| 2003/0014370 A1* | 1/2003 | Charrin | 705/65 |
| 2004/0015243 A1* | 1/2004 | Mercredi et al. | 700/17 |
| 2004/0059924 A1* | 3/2004 | Soto et al. | 713/186 |
| 2004/0177097 A1* | 9/2004 | Yu et al. | 707/104.1 |
| 2004/0192438 A1* | 9/2004 | Wells et al. | 463/29 |
| 2004/0192442 A1* | 9/2004 | Wells et al. | 463/36 |
| 2005/0018883 A1* | 1/2005 | Scott | 382/115 |
| 2005/0043096 A1* | 2/2005 | Kerr | 463/42 |
| 2005/0144133 A1 | 6/2005 | Hoffman et al. | |
| 2005/0149742 A1* | 7/2005 | Weis | 713/186 |
| 2005/0275888 A1* | 12/2005 | Cannon et al. | 358/1.15 |
| 2006/0064380 A1* | 3/2006 | Zukerman | 705/44 |
| 2009/0031125 A1* | 1/2009 | Bjorn | 713/155 |
| 2011/0289567 A1* | 11/2011 | Bauer-Hermann et al. | 726/6 |

* cited by examiner

BIOMETRIC VERIFICATION FOR ELECTRONIC TRANSACTIONS OVER THE WEB

This application is a Continuation of application Ser. No. 09/893,714, filed on Jun. 29, 2001 now abandoned, and for which priority is claimed under 35 U.S.C. §120; and this application claims priority of Application No. PI 2000 2960 filed in Malaysia on Jun. 29, 2000 under 35 U.S.C. §119; the entire contents of all are hereby incorporated by reference.

BACKGROUND OF THE INVENTION

1. Field of the Invention

This invention relates generally to providing security for electronic commerce, and more particularly to a method for minimizing the potential for unauthorized use of digital information, particularly software programs, digital content and other computer information. This invention can also be used in other processes, which require authentication of users.

2. Description of Background Art

Electronic commerce, or e-commerce as it is commonly called, includes the transfer of orders or other sales communications, credit information, electronic "funds", and digital products. Electronic commerce has been recognized as offering the promise of providing speed and convenience to many types of commercial activities. Interest in electronic commerce has heightened with the advent of widely accessible communication systems such as the Internet. Other means for providing electronic commerce include direct telephone line connections, interactive cable or television services, telefacsimile services, local and wide area network communications and the like. Electronic data communications technologies, particularly the Internet, have greatly enhanced marketing and retail opportunities and activities. To a large extent, the promise of electronic commerce has not been fully realized, partially because of concerns with security such as the potential for unauthorized manipulation of information. Such unauthorized manipulation of information includes diverting electronic fund transfers and delivery of unauthorized software (also referred to as "bootleg" or "pirated" software) to unauthorized destinations.

The electronic commerce operations especially electronic commerce transactions require security, since it is based over an open network. The present security solutions include encryption, that is normally undertaken to ensure privacy so that no person(s) other than the intended recipient can decrypt the information. However, it does not guarantee the authenticity of the person who initiates the transaction.

"Internet Banking" is a technology advancement that provides a convenient way of banking at home or from any other place by using a computer. As can be understood from the word "Internet", Internet Banking is over an open network and security for authentication must be in place to secure the transactions. Since all of the security solutions have been put in place, what could possibly be wrong with the current system of security in Internet Banking?

For example, credit card transactions over the Internet are a way of online payment and are a part of Internet Banking. Credit cards were used on the Internet, mainly for buying products and services online and for other authentication purposes. The current way of using a credit card is, providing the credit card number, expiration date or Postal Code and other information required for credit card payments. All of this information is used to verify the validity of the card and the available balance. However, there is no system to check the person using the credit card in online transactions.

The identity of the person initiating the credit card transaction is required, since a credit card can be used by providing the credit card number and the expiration date or any other information required. Even a child can buy products or services online using a credit card by entering the credit card number and other required information without the knowledge of the card holder, if this information is known.

This can be with or without an intention, but the security lapse can be exploited. Due to this, the wrong person may be charged for the transaction and may also result in financial losses. These losses that occur due to failure in authentication, can be suppressed if the invented security solution is implemented.

The security solution can also be implemented in Automated Teller Machines where the security lapse in authentication, is evident. As per the recent market study, it is observed that a considerable sum of money per day per ATM is lost through these fraudulent transactions. The reason being the insufficient security features to authenticate the customer in the ATM, that is, the person starts with the transactions when he or she inserts the card and the PIN. Even an onlooker can transact with the information.

The security solution can also be used to authenticate the persons refilling the cash in the ATM.

A person issuing a check must authenticate the check when the check is presented for clearance depending upon the permissible limit and the value of the check. At present, the universal method for this authentication is to confirm from the check issuer by telephone. Accordingly, the authentication of the person confirming is not guaranteed.

Patient history is an essential requirement to treat patients during emergencies like critical illness and accidents. With the advent of technology, patient history can be stored online using the Internet, so that the patient or the doctor has easy access to the information. In this case, the security (authentication) should be adequate to ensure that the information does not go into the wrong hands.

The invention can also be used to screen blood donors for critical illness and other blood transmitted diseases.

The security solution can be extended to provide security at Automated Teller Machines, Access Control systems, Online Banking, Banking Services, Medical portals, e-business, networking, inter-networking, cellular phones, data ports, printers, fax machines, notebook computers, palm top computers, palm pilots, microfiche devices, scanners, cameras, modems, communication access, personal data systems, pagers, vending machines, PC terminals, information kiosks, point of sales (POS), sharing valuable information with authorized users, wireless transmissions, telecommunications, telephony, SmartCard access controls, remote access networks, debit cards, credit cards, prepaid cards, magnetic cards, phone cards, identifying devices, hotel room key cards, net PC, phone having access to the Internet, data security, bank locker systems, interbank transactions.

The security solution can be used to replace passwords, which are hard to remember. This will prevent unauthorized persons from gaining access to resources if they come to know about the password. Accordingly, the security solution ensures that only authorized persons are given access to secured resources.

SUMMARY OF THE INVENTION

The invention disclosed herein uses "biometrics" technology that is verification/identification of an individual's unique physical or behavioral traits. Types of "biometrics" methods include fingerprint scanning, iris scanning, retina scanning, handwriting analysis, handprint recognition and voice recognition. The invention may also use the combination of all or some "biometrics" technology.

The invention disclosed herein utilizes "biometrics" technology for authentication to permit world wide electronic commercial transactions to be carried out in a highly secured manner over an open network.

A security system for electronic commerce to verify the authenticity of a user comprising; installation of a server authentication program in a web-server of a web-service provider; downloading and installation of a client software component at a workstation of a client; integration of the server authentication program with existing web application with the web service provider; user entering the existing security parameters activation of biometric scanner pre-installed at the work station of client gathering biometrics image and converting into digital data; compression and encryption of data from biometrics scanner; transmittance of compressed and encrypted data to web server; compression of encrypted data with stored in the database; sending of status codes of comparison, if comparison is successful, to application at web service provider.

The invention also implements compression and encryption to protect the "biometrics" identification data.

The invention does not store the image of the "biometrics" information, instead stores the data on the unique physical or behavioral traits.

The invention includes a server authentication program, which verifies the scanned "biometrics" information with the information stored in the database.

The invention includes a server containing the authentication program, which may be connected to an open network like network or to a local network.

The invention provides flexibility in installing the server authentication program in other servers, which are not a part of invention.

The invention also provides flexibility to install the authentication program for a web-site.

The invention also provides functionality to implement the authentication module for verification the "biometrics" information in embedded systems.

The invention uses Database Servers like Relation DataBase Management System (RDBMS), DataBase Management System and other data storage systems for storing the "biometrics" information.

The invention stores the "Biometrics" information based on the unique identification of the user in the real world, in the Internet or uniquely generated information in the Database Servers.

The invention includes a compatible "biometrics" scanner or reader to gather the "biometrics" information of an individual.

The invention includes the client component that consists of hardware drivers, and a "biometrics" retrieval program, which needs to be installed in the computer to gather the "biometrics" information from the connected "biometrics" scanner.

In the invention, the program in the server and in the client may be connected over an open or private network or a secured open or private network.

The invention disclosed herein permits ordering of goods and services in a secured manner.

The invention disclosed herein also permits the payment for goods and services only from the authorized sources.

The invention disclosed herein also helps in checking the person's identity in a transaction.

The invention disclosed herein permits access to the resources to only authorized persons.

The invention disclosed herein facilitates online enrollment of new or existing user's fingerprints.

The invention disclosed herein allows storing additional fingerprints for an existing user.

The invention disclosed herein provides an online verification test for the enrollment of fingerprints.

The invention disclosed herein allows more than one fingerprint of the same person to be stored. The users can even store the fingerprint of all of the fingers for easy authentication.

The invention disclosed herein ensures that only the authorized persons get the required information from the secured sources.

The invention also permits the handling of various stock transactions, including tenders, in a secured fashion over an open network.

The invention disclosed herein can be used for electronic commerce transactions for verifying the authenticity of the transactions by the authorized person.

The invention disclosed herein enables all web-sites to use "biometrics" verification technology as part of their authentication process.

The invention disclosed herein also permits the authorized payment or transfers of electronic cash over an open network.

One principal advantage of the invention is the ability to utilize "biometrics" technology to undertake secured financial and other electronic transactions over publicly accessible networks.

An advantage of the invention resides in automatic and controlled access to network applications utilizing "biometrics" technology.

An advantage of the invention resides in the creation and processing of electronic cash with the highest degree of convenience as currency and with the same degree of security.

An advantage of the invention resides in reducing credit card fraud and fraud at Automated Teller Machines.

An advantage of the invention resides in any web-site that can instantly link to the "biometrics" authentication service, which is a part of the invention, without major changes in the existing applications at the web-site.

An advantage of the invention is the integration of "biometrics" technology with the existing available authentication methods to facilitate secure electronic transactions over an unsecured network.

An advantage of the invention is during authentication; the fingerprint verification is done with all of the fingerprints stored in the database. Hence, the users don't even need to remember which finger is to be placed on the sensor for verification.

Other advantages and objects of the invention are achieved by integrating the invention with existing web-sites by linking the existing authentication methods or by embedding the invention into the existing authentication methods to provide the highest level of security during authentication.

The invention is also directed to a method of conducting electronic-commerce transactions over an unsecured network by registering the fingerprints of the users and authenticating electronic transactions using a "biometrics" verification technology. In this way, each and every transaction on the Internet can be secured. This method has applicability to a number of business transactions such as in authenticating offers, counteroffers and acceptance in a contract negotiations process; authenticating offers, bids and/or confirmations of sale in an auction process; authenticating a guarantee; authenticating orders and/or payments in a purchase/sell transaction;

authenticating transfers of intangible personal property; authenticating tender offers and/or one or more tenders of shares of stock; authenticating certificates of insurance; authenticating transfers of intangibles related to an escrow transaction and authenticating transfers of electronic money.

Another object and advantage of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

The invention disclosed herein can be used to screen blood donors for critical illnesses and other blood transmitted diseases.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
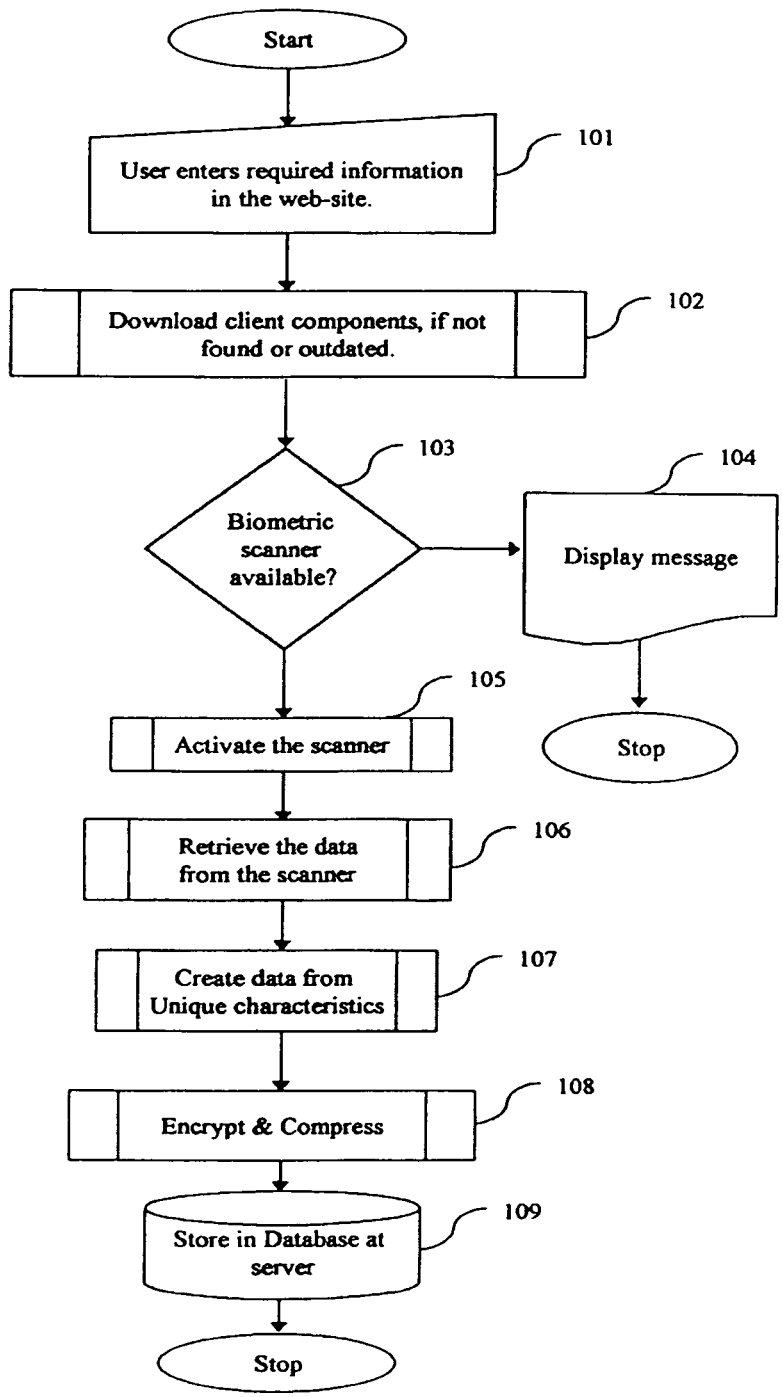
FIG. 1 is a flow diagram of the process for online enrollment of "biometrics" data for new users in a web-site.

FIG. 1, is a flow diagram of the process for online enrollment of "biometrics" data for new users in a web-site. The process explained in the diagram is for storing the "biometrics" data that will be used for verification during the authentication on a web-site. The enrollment process is standard but may vary depending upon the requirements of the web-site. The "biometrics" data will be stored in the database server for a user identified by the unique identity in the web-site or in the real world. The database server will reside along with the web-site so as to maintain the consistency of the data for other web-sites stored on the same server.

The process initiator is the client software component, which is installed and used in step 102. Before step 102, the user enters the required information to create a temporary/permanent unique identification in the web-site as in step 101. The information required by the web-site is designed and will be implemented in the web-site by the administrator of the web-site and the web-site will call the invention's authentication program for activating the core process of enrollment.

The basic requirement for the invention to select the "biometrics" data; is the unique identifier also used during verification/authentication. This unique identifier that is generated by the web-site or entered by the user will be sent to the invention's authentication module. The authentication module will then redirect the web-browser to the enrollment page and step 102 to start to process the data given.

The identifier is unique throughout the user database of the invention's database server. The client components introduced in step 102 of this process, will be in the form of downloadable components (like ActiveX, Plug-in, Java Applets) that will be compatible with all the available web-browsers, which is the main user-interface for the user. The versioning of the component will be maintained so that the web-browser will automatically download the latest components.

The execution of step 102 is wholly taken care of by the browser and the deployment of the components is made compatible for the same. In step 102, all the drivers and other necessary software components will be downloaded to the client PC.

At step 103, the client component will start processing the data. Firstly, it will check for existence of the "Biometrics" scanner. This is done by communicating with the "Biometrics" scanner specified protocol, and the "Biometrics" scanner drivers supplied by the vendor.

If the "Biometrics" scanner is not present or connected or if there is any problem in communicating with the "Biometrics" scanner by the client component, the client component will immediately display the informative message (step 104) related to the cause of the communication problem.

The client component will also guide the user with the troubleshooting steps (if any) to rectify the communication problem. If the problem persists, the client component will immediately terminate the process by disconnecting itself from the server component. The server component, if disconnected from the client component will terminate the process at the server and will redirect the web-browser to a web-page, from where the user will be guided.

However, if the "Biometrics" scanner is present and connected (step 105), the client component will activate the scanner. All the communications with the scanner are done through the vendor supplier drivers and support software.

In case of fingerprint security, the user will be directed to place their finger on the scanner, and in other cases, the user will be directed to follow the steps provided based on the type of "biometrics" technology used.

When the "biometrics" data is successfully obtained from the user (step 106), then the client component will identify the unique physical or behavioral characteristics (step 107) and will convert them into a binary data.

The client component will use the standard encryption method and compression (step 108), then the processed data will be sent to the invention's server component at the server.

The server component will validate the data sent and will store the "biometrics" data in the database server (step 109).

After step 109, the process is complete, and the server component will redirect the web-browser to the web-page as required by the web-site.

From steps 103 to 109, the connection between the server and the client component will be open. Any disconnection either by the client component or the server component will be taken as the termination of the process and the finalization procedures will be run for the processes in the server and the client. These include clearing of buffers, temporary areas, swap area and other operations as required.

The finalization procedure herein mentioned will also be executed during the successful completion of the process illustrated in FIG. 1.

Figure 2A:
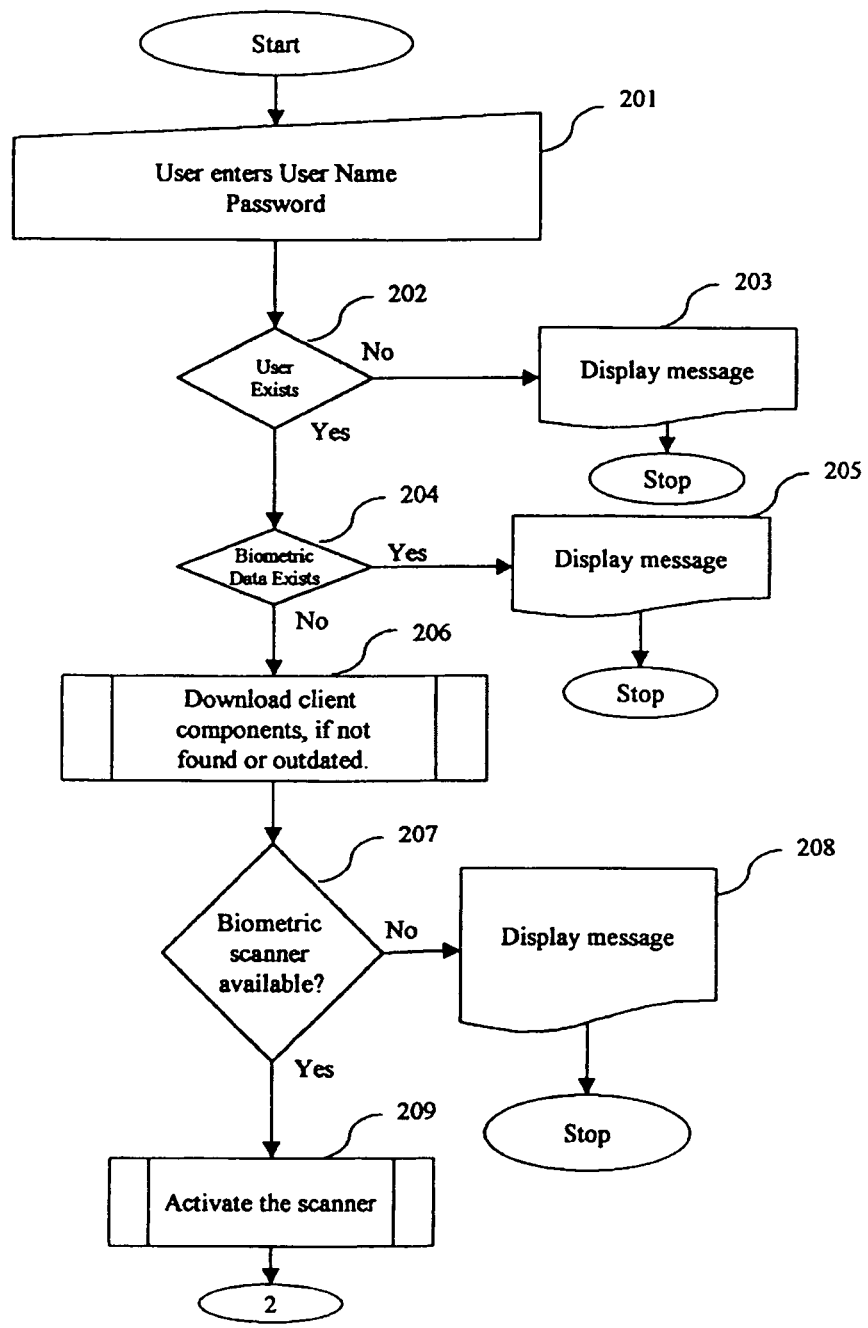
FIGS. 2a and 2b are a flow diagram of the process for online enrollment of "biometrics" data for an existing user in a web-site.
Figure 2B:
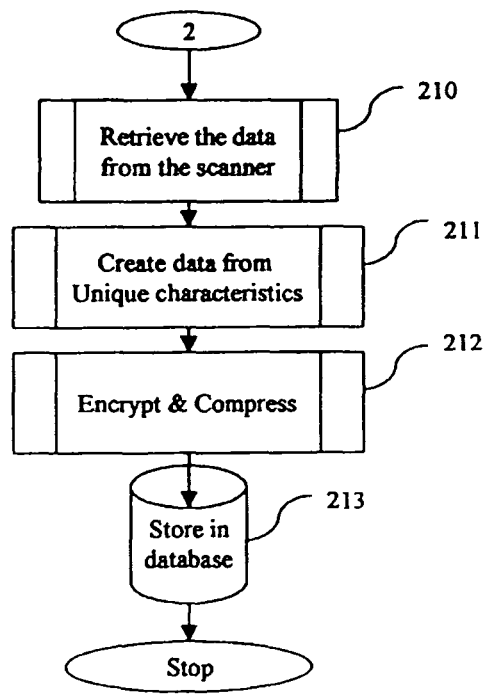

FIG. 2, is a flow diagram of the process for online enrollment of "biometrics" data for an existing user in a web-site. The process explained in the diagram is for storing the "biometrics" data that will be used for verification during the authentication on a web-site. The enrollment process is standard but may vary depending upon the requirements of the web-site. The "biometrics" data will be stored in the database server for a user identified by the unique identity in the web-site or in the real world. The database server will reside along with the web-site so as to maintain the consistency of the data for other web-sites stored on the same server.

The process initiator is the client software component, which is installed and used in step 206. Before step 206, in step 201, the user enters the required information and the entered information is validated for the existence of the user in the web-site (step 202). The information required by the web-site is designed and will be implemented in the web-site by the administrator of the web-site and the web-site will call the invention's authentication program for activating the core process of enrollment.

The basic requirement for the invention to select the "biometrics" data, is the unique identifier, which is also used during verification/authentication of "biometrics" data. This unique identifier that is generated by the web-site or entered by the user will be sent to the invention's authentication module. The authentication module will then redirect the web-browser to the enrollment page and step 206 to start to process the data given. The identifier is unique throughout the user database of the invention's database server. The client components introduced in step 206 of this process, will be in the form of downloadable components (like ActiveX, Plug-in, Java Applets) that will be compatible with all the available web-browsers, which is the main user-interface for the user. The version of the component will be maintained so that the web-browser will automatically download the latest components. The invention's authentication module at the server will check for the existence of any stored "biometrics" information for the user (if any). An informative message will be displayed (step 205) then the process will be terminated.

The execution of step 206 is wholly taken care by the web-browser and the deployment of the components is made compatible for the same. In step 206, all of the drivers and other necessary software components will be downloaded to the client PC.

From step 207, the client component will start processing the data. Firstly, it will be the check for existence of the "Biometrics" scanner. This is done by communicating using the "Biometrics" scanner specified protocol using the "Biometrics" scanner vendor supplied drivers.

If the "Biometrics" scanner is not present or connected or if the is any problem in communicating with the "Biometrics" scanner by the client component, the client component will immediately display the informative message at step 208 related to the cause of the communication problem.

The client component will also guide the user with the troubleshooting steps (if any) to rectify the communication problem. If the problem persists, the client component will immediately terminate the process by disconnecting itself from the server component. The server component, if disconnected by the client component will terminate the process at the server and will redirect the web-browser to a web-page, from where the user will be guided.

However if the "Biometrics" scanner is not present, the client component will activate the scanner (step 209). All the communications with the scanner are done through the vendor supplier drivers and support software.

In case of fingerprint security, the user will be directed to place their finger on the scanner and in other cases, the user will be directed to follow the steps provided based on the type of "biometrics" technology used.

When the "biometrics" data is successfully obtained from the user (step 210), then the client component will identify the unique physical or behavioral characteristics (step 211) and will convert them into binary data.

The client component will use the standard encryption method and compression (step 212), then the processed data will be sent to the invention's server component at the server.

The server component will validate the data sent and will store the "biometrics" data in the database server (step 213). The server component will store the "biometrics" data based on the unique identifier sent to the server's authentication module by the application at the web-site.

After step 213, the process is complete. Accordingly, the server component will redirect the web-web-browser to the web-page as required by the web-site.

From steps 206 to 213 the connection between the server and the client component will be open. Any disconnection either by the client component or the server component will be taken as the termination of the process and the finalization procedures will be run for the processes in the server and the client. These include clearing of buffers, temporary areas, swap area and other operations as required.

The finalization procedure herein mentioned will also be executed during the successful completion of the process illustrated in FIG. 2.

Figure 3A:
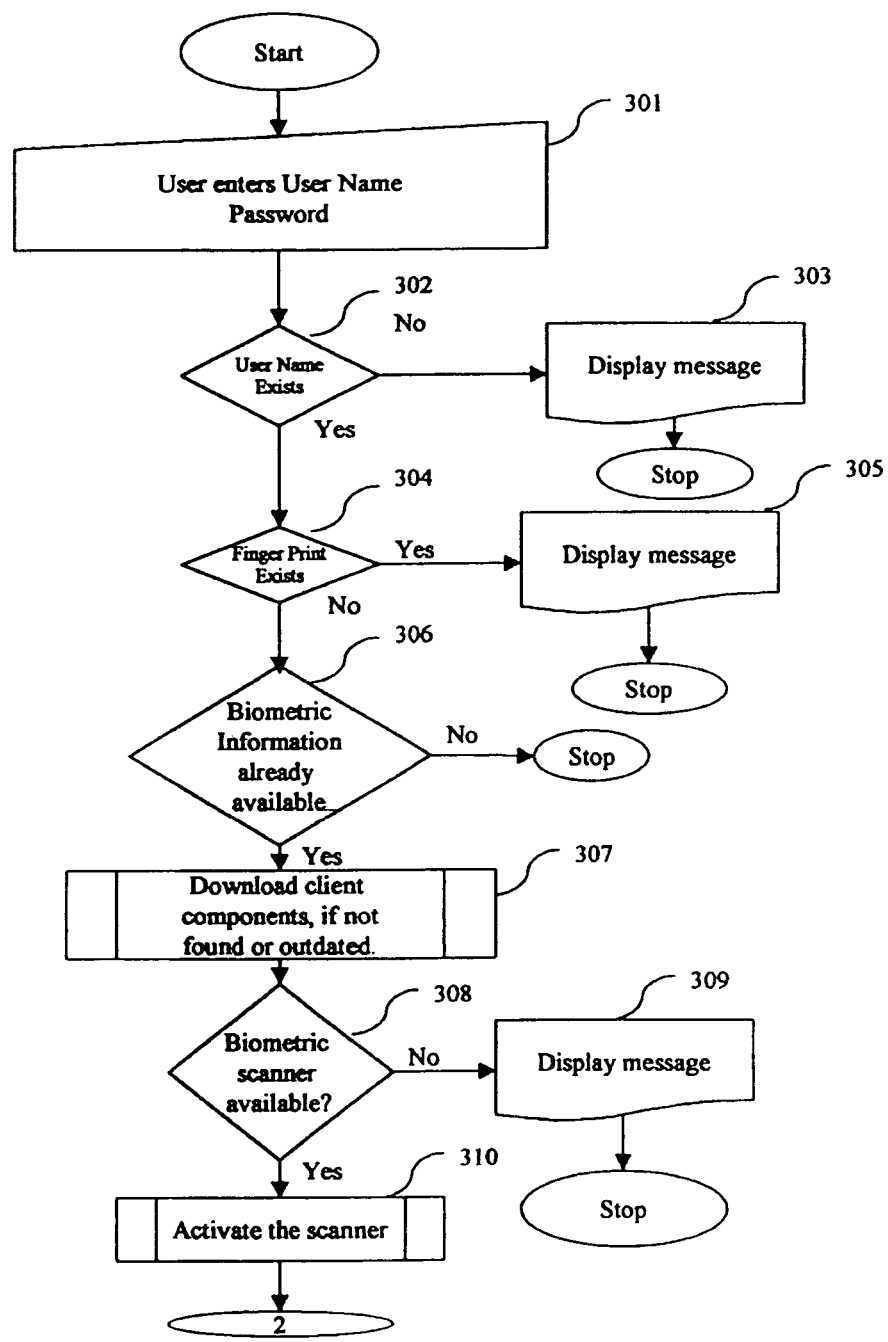
FIGS. 3a and 3b are a flow diagram of the process for online enrollment of additional "biometrics" data for an existing enrolled user in a web-site.
Figure 3B:
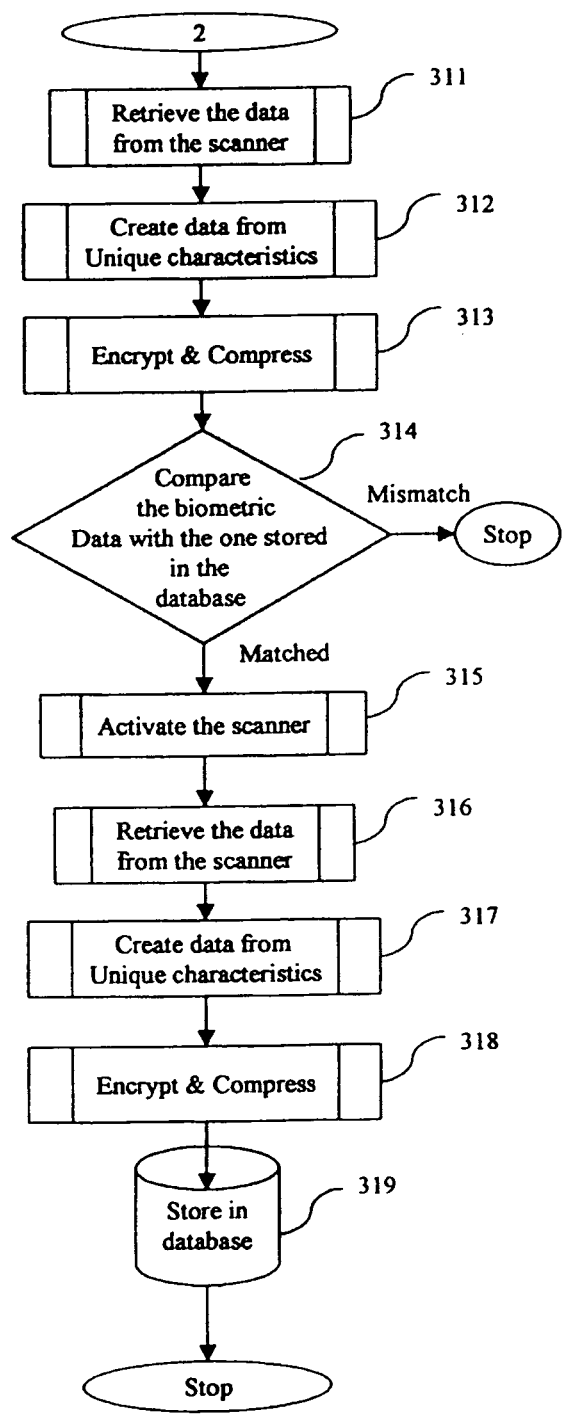

FIG. 3, is a flow diagram of the process for online enrollment of additional "biometrics" data for an existing enrolled user in a web-site. The process explained in the diagram is for storing the "biometrics" data that will be also used for verification during the authentication on a web-site. In the process of fingerprint verification, this additional fingerprint storage will help in reducing false rejection during verification and facilitates the user to use any of the enrolled fingerprints during verification.

The enrollment is a standard process, but it may vary depending upon the requirements of the web-site. The "biometrics" data will be stored in the database server for a user identified by the unique identity in the web-site or in the real world. The database server will reside along with the web-site so as to maintain the consistency of the data for other web-sites stored on the same server.

The process initiator is the client software component, which is installed and used in step 307. Before step 307, in step 301, the user enters the required information and the information entered is validated for the existence of the user in the web-site (step 302). The information required by the web-site is designed and will be implemented in the web-site by the administrator of the web-site and the web-site will call the invention's authentication program for activating the core process of enrollment.

The invention's authentication program will check for the existence of stored "biometrics" data. If no data was stored, then the process will be terminated with an informative message (step 304). This is done mainly to redirect the user to use the process as illustrated in FIG. 1. This checking for termination of the process, in case of a new user is optional.

Upon verification, the unique identifier is selected from the user's database and sent to the server authentication module. The unique identifier is the basic requirement for the invention to select the "biometrics" data and is also used for verification/authentication. The authentication module will redirect the web-browser to the enrollment page from where step 307 starts processing.

The identifier is unique throughout the user database of the invention's database server. The client components introduced in step 307 of this process, will be in the form of downloadable components (like ActiveX, Plug-in, Java Applets) that will be compatible with all the available web-browsers, which is the main user-interface for the user. The versioning of the component will be maintained so that the Web-Browser will automatically download the latest components.

The execution of step 307 is wholly taken care of by the web-browser and the deployment of the components is made compatible for the same. In step 307, all the drivers and other necessary software components will be downloaded to the client PC.

From step 308, the client component will start processing the data. Firstly, it will be the check for existence of the "Biometrics" scanner (step 308). This is done by communicating using the "Biometrics" scanner specified protocol using the "Biometrics" scanner vendor supplied drivers.

If the "Biometrics" scanner was not present or connected or if there is any problem in communicating with the "Biometrics" scanner by the client component, the client component will immediately display an informative message at step 309 related to the cause of the communication problem.

The client component will also guide the user with the troubleshooting steps (if any) to rectify the communication problem. If the problem persists, the client component will immediately terminate the process by disconnecting itself from the server component. When the server component is disconnected from the client component, it will terminate the process at the server and will redirect the web-browser to a web-page, from where the user will be guided.

However, if the "Biometrics" scanner was present at step 310, the client component will activate the scanner. All of the communications with the scanner is done through the vendor supplier drivers and support software.

In case of fingerprint security, the user will be directed to place their finger on the scanner and, in other cases, the user will be directed to follow the steps provided based on the type of "biometrics" technology used.

When the "biometrics" data is successfully obtained from the user in step 311, then the client component will identify the unique physical or behavioral characteristics (step 312) and will convert them into binary data.

The client component will use the standard encryption method and compression (step 313), then the processed data will be sent to the invention's server component at the server.

The server component will validate the data sent and will compare the sent "biometrics" data with that stored in the database. The identification of the "biometrics" data in the database is done based on the unique identifier sent initially.

If the comparison was not successful, the process will be terminated with an informative message.

If the comparison was successful, the process of enrolling the additional "biometrics" information starts. The process includes activating the scanner (step 315), retrieving the "biometrics" data from the scanner (step 316), creating data from the characteristics (step 317), encrypting and compressing (step 318).

After step 318, the data is sent to the server. The server will validate the data sent and will store the "biometrics" data sent as additional "biometrics" data that will be used during verification.

From steps 307 to 319 the connection between the server and the client component will be open. Any disconnection either by the client component or the server component will be taken as the termination of the process and the finalization procedures will be run for the processes in the server and the client. These include clearing of buffers, temporary areas, swap area and other operations as required.

The finalization procedure herein mentioned will also be executed during the successful completion of the process illustrated in FIG. 3.

Figure 4:
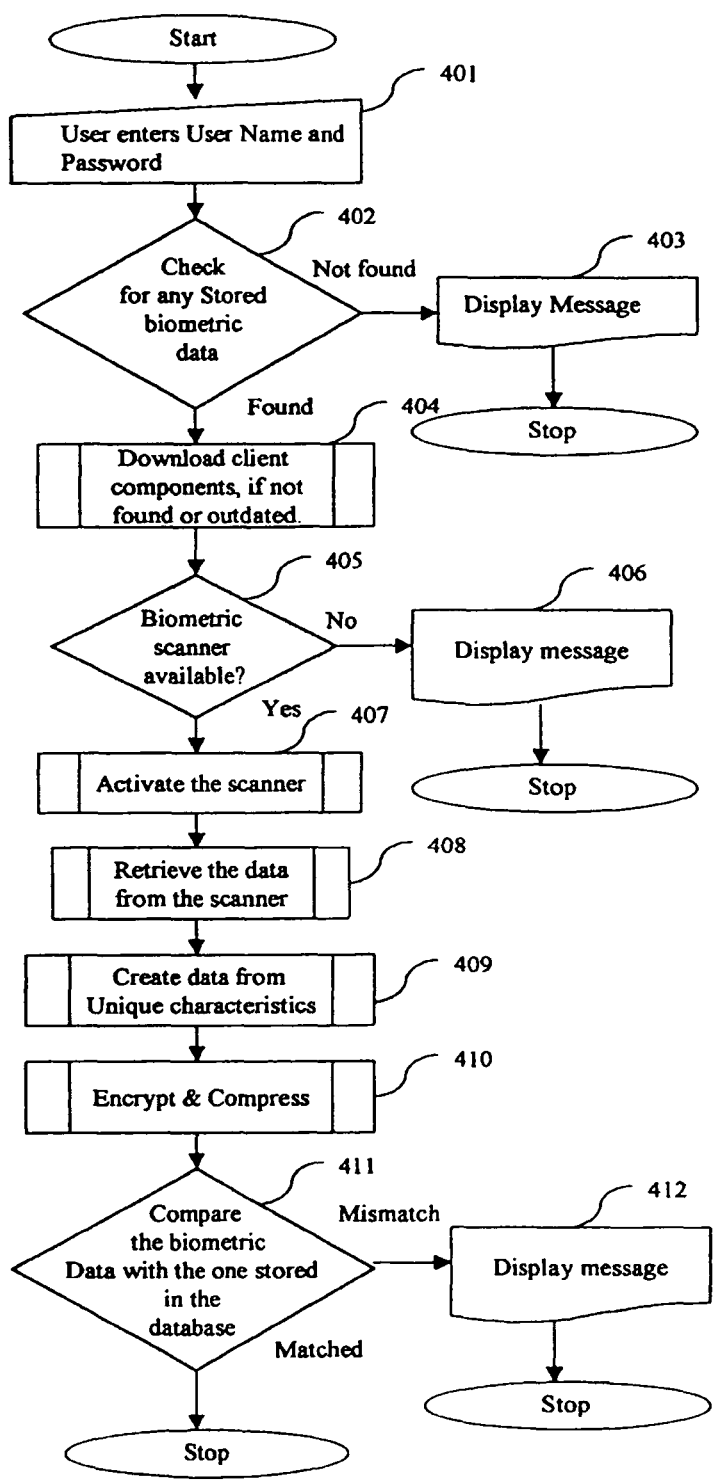
FIG. 4 is a flow diagram of the process for online verification of stored "biometrics" data for an existing enrolled user in a web-site.

FIG. 4, is a flow diagram of the process for online verification of stored "biometrics" data for an existing enrolled user in a web-site.

The enrollment process is standard but may vary depending upon the requirements of the web-site. The "biometrics" data will be stored in the database server for a user identified by the unique identity in the web-site or in the real world. The database server will reside along with the web-site so as to maintain the consistency of the data for other web-sites stored on the same server.

The process initiator is the client software component, which is installed and used in step 404. Before step 404, in step 401, the user enters the required information and the information entered is validated for the existence of the user in the web-site. The information required by the web-site is designed and will be implemented in the web-site by the administrator of the web-site and the web-site will call the invention's authentication program for activating the core process of enrollment.

The invention's authentication program will check for the existence of stored "biometrics" data (step 402). If no data was stored, then the process will be terminated with an informative message (step 403).

Upon verification, the unique identifier is selected from the user's database and sent to the server authentication module. The unique identifier is the basic requirement for the invention to select the "biometrics" data and is also used for verification/authentication. The authentication module will redirect the web-browser to the enrollment page from where step 404 processing starts.

The identifier is unique throughout the user database of the invention's database server. The client components introduced in step 404 of this process, will be in the form of downloadable components (like ActiveX, Plug-in, Java Applets) that will be compatible with all the available web-browsers, which is the main user-interface for the user. The versioning of the component will be maintained so that the Web-Browser will automatically download the latest components.

The execution of step 404, is wholly taken care by the web-browser and the deployment of the components is made compatible for the same. In step 404, all of the drivers and other necessary software components will be downloaded to the client PC.

From step 405, the client component will start processing. The first will be the checking for existence of the "Biometrics" scanner (step 405). This is done by communicating using the "Biometrics" scanner specified protocol using the "Biometrics" scanner vendor supplied drivers.

If the "Biometrics" scanner was not present or connected or if there is any problem in communicating with the "Biometrics" scanner by the client component, the client component will immediately display an informative message 406 related to the cause of the communication problem.

The client component will also guide the user with the troubleshooting steps (if any) to rectify the communication problem. If the problem persists, the client component will immediately terminate the process by disconnecting itself from the server component. The server component, upon disconnection by the client component will terminate the process at the server and will redirect the web-browser to a web-page, from where the user will be guided.

If the "Biometrics" scanner was present, the client component will activate the scanner (step 407). All of the communications with the scanner is done through the vendor supplier drivers and support software.

In case of fingerprint security, the user will be directed to place their finger on the scanner and, in other cases, the user will be directed to follow the steps provided based on the type of "biometrics" technology used.

When the "biometrics" data is successfully obtained from the user in step 408, then the client component will identify the unique physical or behavioral characteristics (step 409) and will convert them into binary data.

The client component will use the standard encryption method and compression (step 410), then the processed data will be sent to the invention's server component at the server.

The server component will validate the data sent and will compare the sent "biometrics" data with that stored in the database (step 411). The identification of the "biometrics" data in the database is done based on the unique identifier sent initially. If the comparison was not successful, the process will be terminated with an informative message (step 412). The error status will be returned to the application in the web-site for further actions.

If the comparison was successful, the success status will be returned to the application in the web-site for further actions. From steps 405 to 411 the connection between the server and the client component will be open. Any disconnection either by the client component or the server component will be taken as the termination of the process and the finalization procedures will be run for the processes in the server and the client. These include clearing of buffers, temporary areas, swap area and other operations as required.

The finalization procedure herein mentioned will also be executed during the successful completion of the process illustrated in FIG. 4.

Figure 5:
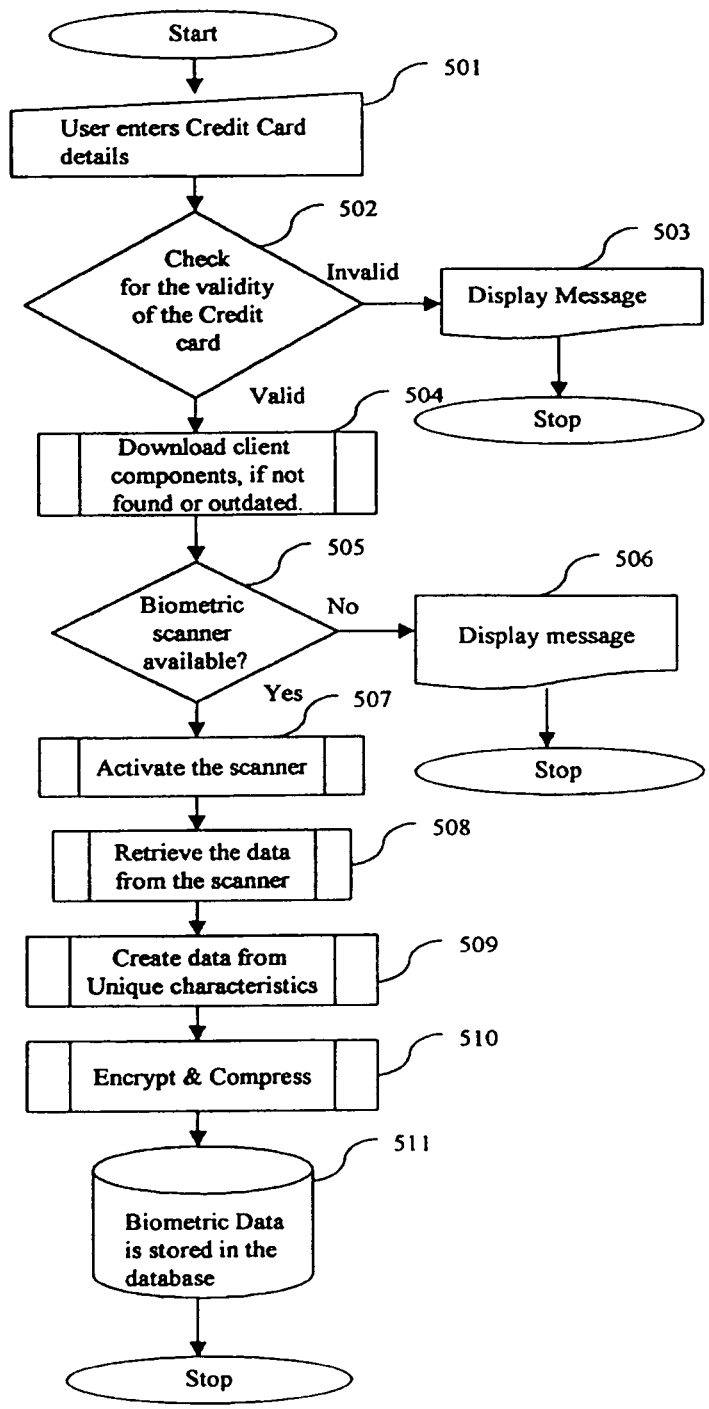
FIG. 5 is a flow diagram of the process for online enrollment of "biometrics" data for credit card users.

FIG. 5, is a flow diagram of the process for online enrollment of "biometrics" data for Credit Card users.

The enrollment process is standard but may vary depending upon the requirements of the web-site. The "biometrics" data will be stored in the database server for a user identified by the unique identity in the web-site or in the real world. The database server will reside along with the web-site so as to maintain the consistency of the data for other web-sites stored on the same server.

The process initiator is the client software component, which is installed and used in step 504. Before step 504, in step 501, the user enters credit card information and the entered information is validated with the credit card database. The credit card information may vary depending upon the requirement of the web-site or type of credit card. If the information is not valid, the process will be terminated by displaying an informative message (step 503).

If the information is valid, the credit card # or any other unique identifier (generated or entered by the user) will be sent to the invention's authentication program, for activating the core process of enrollment.

The invention's authentication program will check for the existence of stored "biometrics" data. If any "biometrics" data exists, then the process will be terminated with an informative message.

The identifier is unique throughout the user database of the invention's database server. The client components introduced in step 504 of this process, will be in the form of downloadable components (like ActiveX, Plug-in, Java Applets) that will be compatible with all the available web-browsers, which is the main user-interface for the user. The versioning of the component will be maintained so that the Web-Browser will automatically download the latest components.

The execution of step 504, is wholly taken care by the web-browser and the deployment of the components is made compatible for the same. In step 504, all of the drivers and other necessary software components will be downloaded to the client PC.

From step 505, the client component will start processing. The first will be checking for the existence of the "Biometrics" scanner (step 505). This is done by communicating using the "Biometrics" scanner specified protocol using the "Biometrics" scanner vendor supplied drivers.

If the "Biometrics" scanner was not present or connected or if there is any problem in communicating with the "Biometrics" scanner by the client component, the client component will immediately display an informative message 506 related to the cause of the communication problem.

The client component will also guide the user with the troubleshooting steps (if any) to rectify the communication problem. If the problem persists, the client component will immediately terminate the process by disconnecting itself from the server component. The server component, upon disconnection by the client component will terminate the process at the server and will redirect the web-browser to a web-page, from where the user will be guided.

If the "Biometrics" scanner was present, the client component will activate the scanner (step 507). All of the communications with the scanner is done through the vendor supplier drivers and support software.

In case of fingerprint security, the user will be directed to place their finger on the scanner and in other cases, the user will be directed to follow the steps provided based on the type of "biometrics" technology used.

When the "biometrics" data is successfully obtained from the user in step 508, then the client component will identify the unique physical or behavioral characteristics (step 509) and will convert them into binary data.

The client component will use the standard encryption method and compression (step 510), then the processed data will be sent to the invention's server component at the server.

The server component will validate the data sent and will store the "biometrics" data sent in the database based on the unique identifier sent by the web-site application. From steps 504 to 511, the connection between the server and the client component will be open. Any disconnection either by the client component or the server component will be taken as the termination of the process and the finalization procedures will be run for the processes in the server and the client. These include clearing of buffers, temporary areas, swap area and other operations as required.

The finalization procedure herein mentioned will also be executed during the successful completion of the process illustrated in FIG. 5.

Figure 6:
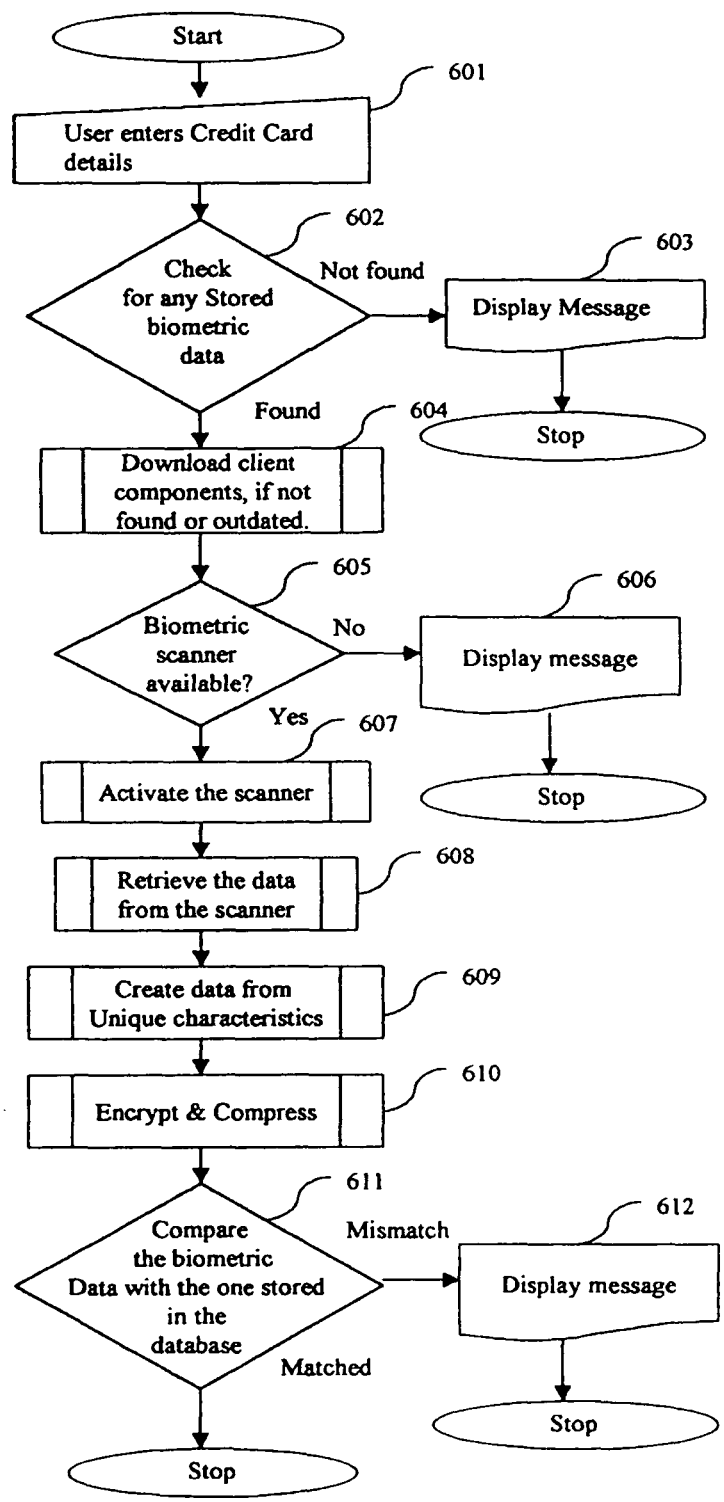
FIG. 6 is a flow diagram of the process for online authentication using "biometrics" in an electronic commerce transaction for credit card users.

FIG. 6, is a flow diagram of the process for online authentication using biometrics in an electronic commerce transaction for credit card users.

For this process, the "biometrics" data of the credit card users must be enrolled using the process illustrated in FIGS. 1 and 3.

This process is only the authentication process that validates the user and the actual electronic commerce application is not illustrated here. This process may occur before or after the electronic commerce process, based on the application design.

The basic requirement for this authentication process is the unique identifier that is generated or entered by the user. In this case, the credit card number may be used as the identifier and the "biometrics" data will be stored based on the identifier, so that during verification the "biometrics" data is selected using the identifier.

In this process, in step 601, the user enters the credit card details as required by the web-site or other authentication authorities for the credit card.

The entered information will be validated by the web-site or credit card authentication authorities and if the entered information is not valid, the process will be terminated immediately by displaying the message. This process is implemented by the web-site and the invention's role does not interfere yet.

The authentication process by the invention's program starts from step 602, after the credit card details provided by the user are validated. The invention's authentication program at the server is activated by providing the unique identifier that will be used for verification.

The process initiator for the invention's authentication program is the client software component, which is installed and used in step 604.

The invention's authentication program will check for the existence of stored "biometrics" data (step 602). If no data was stored for the unique identifier, then the process will be terminated with an informative message (step 603).

The client components introduced in step 604 of this process, will be in form of downloadable components (like ActiveX, Plug-in, Java Applets) that will be compatible with all the available web-browsers, which is the main user-interface for the user. The versioning of the component will be maintained so that the Web-Browser will automatically download the latest components.

The execution of step 604 is wholly taken care of by the web-browser and the deployment of the components is made compatible for the same. In step 604, all of the drivers and other necessary software components will be downloaded to the client PC.

From step 605, the client component will start processing. The first will be checking for existence of the "Biometrics" scanner (step 605). This is done by communicating using the "Biometrics" scanner specified protocol using the "Biometrics" scanner vendor supplied drivers.

If the "Biometrics" scanner was not present or connected or if there is any problem in communicating with the "Biometrics" scanner by the client component, the client component will immediately display an informative message at step 606 related to the cause of the communication problem.

The client component will also guide the user with the troubleshooting steps (if any) to rectify the communication problem. If the problem persists, the client component will immediately terminate the process by disconnecting itself from the server component. The server component, upon disconnection by the client component will terminate the process at the server and will redirect the web-browser to a web-page, from where the user will be guided.

If the "Biometrics" scanner was present, the client component will activate the scanner (step 607). All of the communications with the scanner is done through the vendor supplier drivers and support software.

In case of fingerprint security, the user will be directed to place their finger on the scanner and in other cases, the user will be directed to follow the steps provided based on the type of "biometrics" technology used.

When the "biometrics" data is successfully obtained from the user in step 608, then the client component will identify the unique physical or behavioral characteristics (step 609) and will convert them into binary data.

The client component will use the standard encryption method and compression (step 610), then the processed data will be sent to the invention's server component at the server.

The server component will validate the data sent and will compare the sent "biometrics" data with the one stored in the database (step 611). The identification of the "biometrics" data in the database is done based on the unique identifier sent initially. If the comparison was not successful, the process will be terminated with an informative message (step 612). The error status will be returned to the application in the web-site for further actions.

If the comparison was successful, the success status will be returned to the application in the web-site for further actions. From steps 605 to 611, the connection between the server and the client component will be open. Any disconnection either by the client component or the server component will be taken as the termination of the process and the finalization procedures will be run for the processes in the server and the client. These include clearing of buffers, temporary areas, swap area and other operations as required.

The finalization procedure herein mentioned will also be executed during the successful completion of the process illustrated in FIG. 6.

Figure 7:
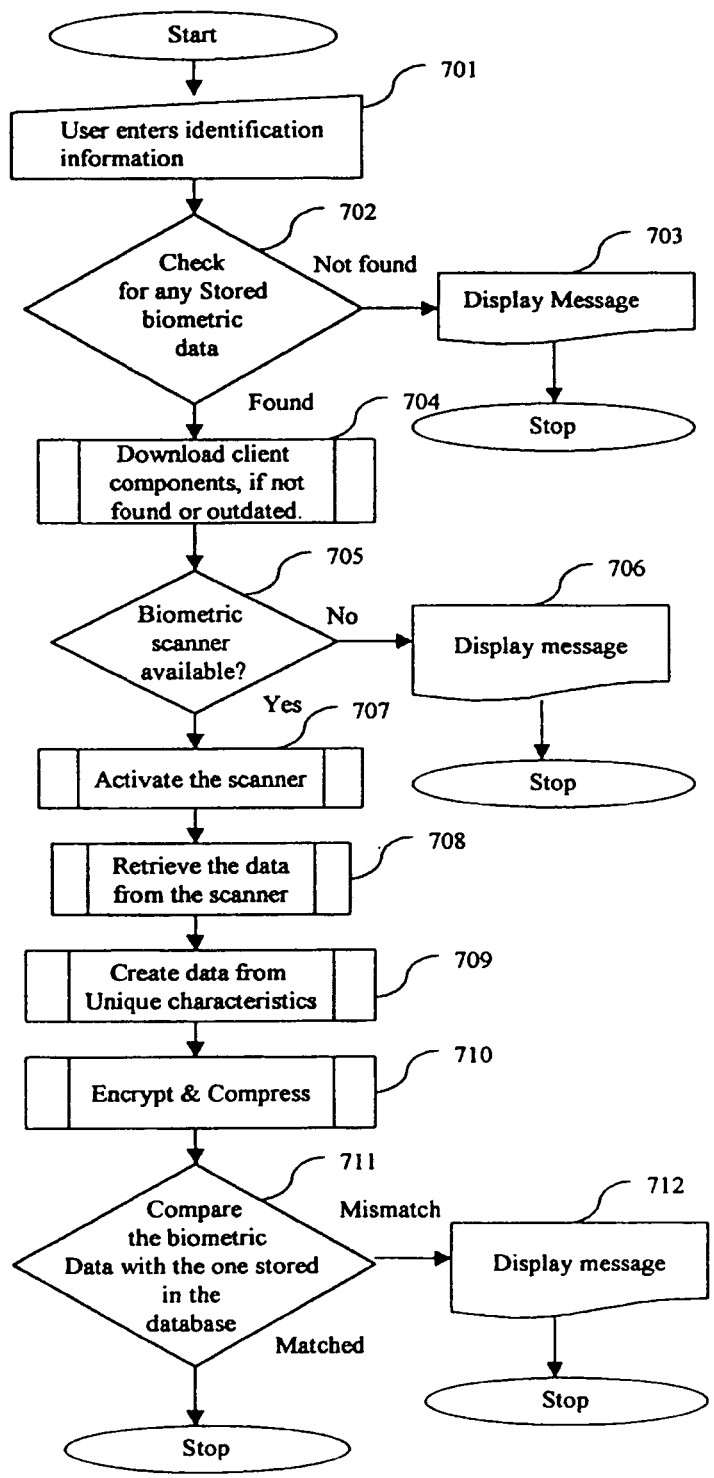
FIG. 7 is a flow diagram of the process for online authentication using "biometrics" in electronic commerce transactions for other identification methods.

FIG. 7, is a flow diagram of the process for online authentication using biometrics in an electronic commerce transaction for other identification methods.

For this process, the "biometrics" data of the users must be enrolled using the process illustrated in FIGS. 1 and 3.

This process is only the authentication process that validates the user and the actual electronic commerce application is not illustrated here. This process may occur before or after the electronic commerce process, based on the application design.

The basic requirement for this authentication process is the unique identifier that is generated or entered by the user. In this case, the user enters, the User Name/ID for example, that may be used as the identifier and the "biometrics" data will be stored based on the identifier, so that during verification the "biometrics" data is also selected using the identifier.

In this process, in step 701, the user enters the identification details as required by the web-site.

The entered information will be validated by the web-site, and if the entered information is not valid, the process will be terminated immediately by displaying the message. This process is implemented by the web-site and the invention's role does not interfere yet.

The authentication process by the invention's program starts from step 702, after the identification details provided by the user are validated. The invention's authentication program at the server is activated by providing the unique identifier that will be used for verification.

The process initiator for the invention's authentication program is the client software component, which is installed and used in step 704.

The invention's authentication program will check for the existence of stored "biometrics" data (step 702). If no data was stored for the unique identifier, then the process will be terminated with an informative message (step 703).

The client components introduced in step 704 of this process will be in the form of downloadable components (like ActiveX, Plug-in, Java Applets) that will be compatible with all of the available web-browsers, which is the main user-interface for the user. The versioning of the component will be maintained so that the Web-Browser will automatically download the latest components.

The execution of step 704 is wholly taken care of by the web-browser and the deployment of the components is made compatible for the same. In step 704, all of the drivers and other necessary software components will be downloaded to the client PC.

From step 705, the client component will start processing. The first will be checking for existence of the "Biometrics" scanner (step 705). This is done by communicating using the "Biometrics" scanner specified protocol using the "Biometrics" scanner vendor supplied drivers.

If the "Biometrics" scanner was not present or connected or if there is any problem in communicating with the "Biometrics" scanner by the client component, the client component will immediately display an informative message at step 706 related to the cause of the communication problem.

The client component will also guide the user with the troubleshooting steps (if any) to rectify the communication problem. If the problem persists, the client component will immediately terminate the process by disconnecting itself from the server component. The server component, upon disconnection by the client component will terminate the process at the server and will redirect the web-browser to a web-page, from where the user will be guided.

If the "Biometrics" scanner was present, the client component will activate the scanner (step 707). All of the communications with the scanner is done through the vendor supplier drivers and support software.

In case of fingerprint security, the user will be directed to place their finger on the scanner and, in other cases, the user will be directed to follow the steps provided based on the type of "biometrics" technology used.

When the "biometrics" data is successfully obtained from the user in step 708, then the client component will identify the unique physical or behavioral characteristics (step 709) and will convert them into binary data.

The client component will use the standard encryption method and compression (step 710), then the processed data will be sent to the invention's server component at the server.

The server component will validate the data sent and will compare the sent "biometrics" data with that stored in the database (step 711). The identification of the "biometrics" data in the database is done based on the unique identifier sent initially. If the comparison was not successful, the process will be terminated with an informative message (step 712). The error status will be returned to the application in the web-site for further actions.

If the comparison was successful, the success status will be returned to the application in the web-site for further actions.

From steps 705 to 711 the connection between the server and the client component will be open. Any disconnection either by the client component or the server component will be taken as the termination of the process and the finalization procedures will be run for the processes in the server and the client. These include clearing of buffers, temporary areas, swap area and other operations as required.

The finalization procedure herein mentioned will also be executed during the successful completion of the process illustrated in FIG. 7.

Figure 8:
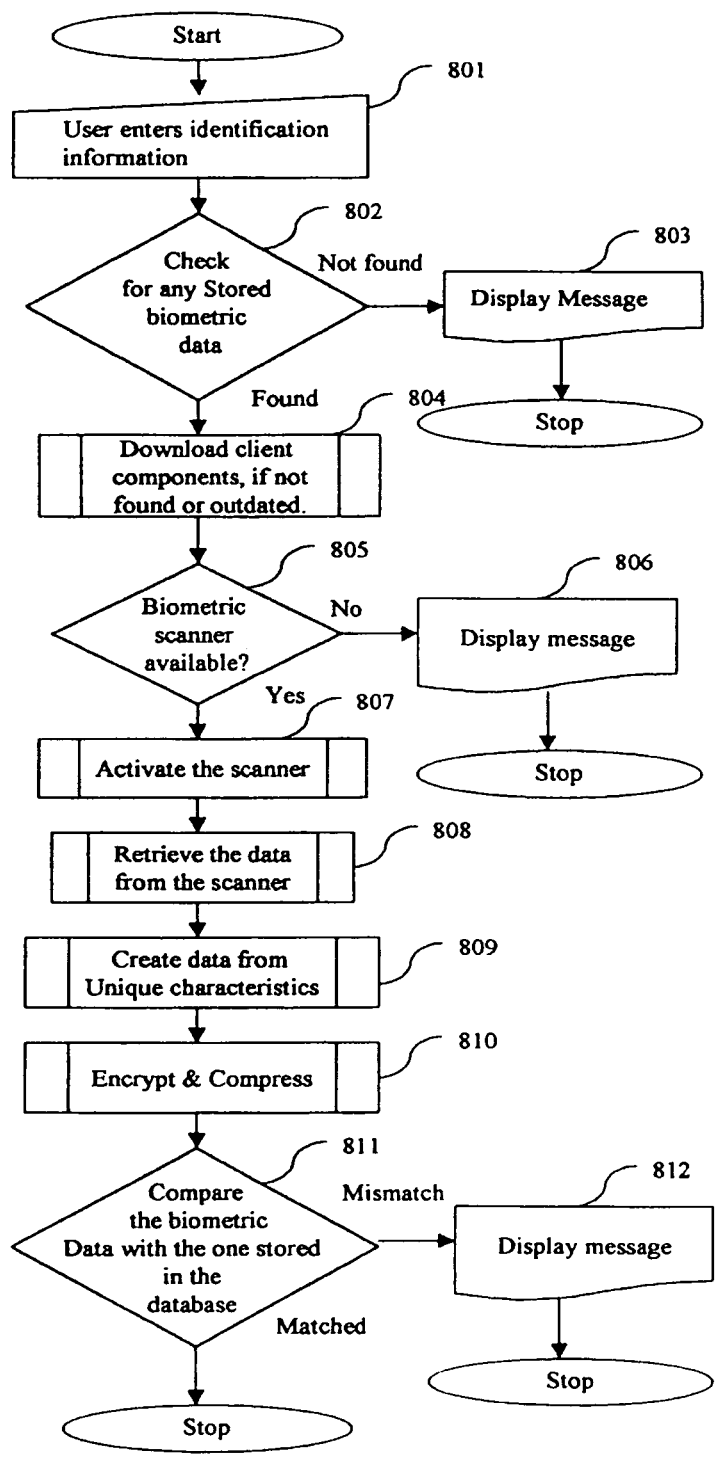
FIG. 8 is a flow diagram of the process for online authentication using biometrics in an ATM transaction.

FIG. 8, is a flow diagram of the process for online authentication using biometrics in an ATM transaction. The process, which is a part of the invention may be used by the financial institution or any other entity, which uses an ATM to serve its customers.

For this process, the "biometrics" data of the users must be enrolled using the process illustrated in FIGS. 1 and 3 with the ATM card number as the unique identifier (optional).

This process is only the authentication process that validates the user, and the actual ATM application is not illustrated here. This process may occur before or after the ATM transaction, based on the application design.

The basic requirement for this authentication process, is the unique identifier that is generated or entered by the user. In an ATM transaction, the unique identifier can be the ATM card number or any other unique identifier, and the "biometrics" data will be stored based on the identifier, so that during verification the "biometrics" data is also selected using the identifier.

In this process, in step 801, user inserts the ATM card and enters the PIN as required by the customer.

The entered information will be validated and if the entered information is not valid, the process will be terminated immediately by displaying the message. This process may be implemented earlier, and the invention's role does not interfere yet.

The authentication process by the invention's program starts from step 802, after the identification details provided by the user are validated. The invention's authentication program at the server is activated by providing the unique identifier that will be used for verification.

The process initiator for the invention's authentication program is the client software component, which is installed and used in step 804.

The invention's authentication program will check for the existence of stored "biometrics" data (step 802). If no data was stored for the unique identifier, then the process will be terminated with an informative message (step 803).

The client components introduced in step 804 of this process, will be in form of downloadable components that are automatically downloaded to the client (ATM) if the component does not exists or if outdated. In step 804, all the drivers and other necessary software components will be downloaded to the client.

From step 805, the client component will start processing. The first will be checking for the existence of the "Biometrics" scanner (step 805). This is done by communicating using the "Biometrics" scanner specified protocol using the "Biometrics" scanner vendor supplied drivers.

If the "Biometrics" scanner was not present or connected or if there is any problem in communicating with the "Biometrics" scanner by the client component, the client component will immediately display an informative message at step 806 related to the cause of the communication problem.

The client component will also guide the user with the troubleshooting steps (if any) to rectify the communication problem. If the problem persists, the client component will immediately terminate the process by disconnecting itself from the server component. The server component, upon disconnection by the client component will terminate the process at the server and will redirect the web-browser to a web-page, from where the user will be guided.

If the "Biometrics" scanner was present, the client component will activate the scanner (step 807). All of the communications with scanner is done through the vendor supplier drivers and support software.

In case of fingerprint security, the user will be directed to place their finger on the scanner and, in other cases, the user will be directed to follow the steps provided based on the type of "biometrics" technology used.

When the "biometrics" data is successfully obtained from the user in step 808, then the client component will identify the unique physical or behavioral characteristics (step 809) and will convert them into binary data.

The client component will use the standard encryption method and compression (step 810), then the processed data will be sent to the invention's server component at the server.

The server component will validate the data sent and will compare the sent "biometrics" data with that stored in the database (step 811). The identification of the "biometrics" data in the database is done based on the unique identifier sent initially. If the comparison was not successful, the process will be terminated with an informative message (step 712). The error status will be returned to the application that called the invention's authentication program.

If the comparison was successful, the success status will be returned to the application that called the invention's authentication program for further actions. From steps 805 to 811, the connection between the server and the client component will be open. Any disconnection either by the client component or the server component will be taken as the termination of the process and the finalization procedures will be run for the processes in the server and the client. These include clearing of buffers, temporary areas, swap area and other operations as required.

The finalization procedure herein mentioned will also be executed during the successful completion of the process illustrated in FIG. 8.

Figure 9:
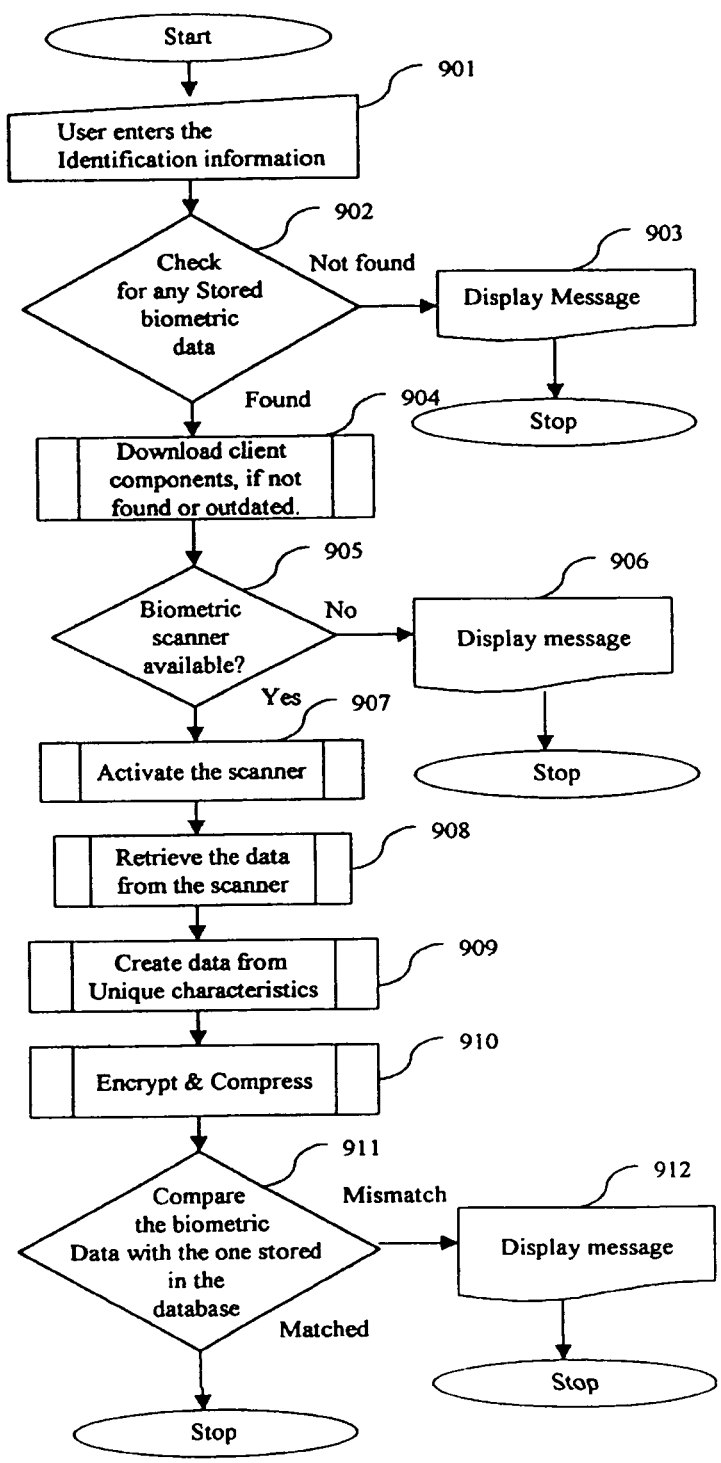
FIG. 9 is a flow diagram of the process for online authentication using biometrics and using the invention's authentication server.

FIG. 9, is a flow diagram of the process for online authentication using biometrics and using the invention's authentication server. The invention's authentication server will be connected to the Internet and the web-site (herein called a "Third-party Web-Site") intended to implement the invention's authentication process, which will link their authentication process to the invention's authentication server. The connectivity between the Third-party Web-site and the invention's authentication server may be through the open network like the Internet or a Local Area Network also called as LAN.

For this process, the "biometrics" data of the users must be enrolled using the process illustrated in FIGS. 1 and 3 using the unique identifier generated and sent by the application at the third-party web-site.

This process is only the authentication process that validates the user and the actual application is not illustrated here and it is executed on the third-party web-site. The application in the third-party web-site may be linked to the invention's authentication based on the requirement.

The basic requirement for this authentication process, is the unique identifier that is generated or entered by the user and the "biometrics" data will be stored based on the identifier, so that during verification the "biometrics" data is also selected using the identifier.

In this process, in step 901, the user enters the identification information in the third-party web-site as required.

The entered information will be validated and, if the entered information is not valid, the process will be terminated immediately by displaying the message. This process of validating the information entered is implemented only by the third-party web-site.

The authentication process by the invention's program starts from step 802, after the identification details provided by the user are validated. The invention's authentication program at the server is activated by providing the unique identifier that will be used for verification. The application in the third-party web-site will be linked to the authentication server by redirecting the web-browser to the authentication page on the authentication server.

The process initiator for the invention's authentication program is the client software component, which is installed and used in step 904.

The invention's authentication program will check for the existence of stored "biometrics" data (step 902). If no data was stored for the unique identifier, then the process will be terminated with an informative message (step 903).

The client components introduced in step 904 of this process will be in the form of downloadable components that are automatically downloaded to the client computer if the component does not exist or if outdated. In step 904, all the drivers and other necessary software components will be downloaded to the client PC.

From step 805 the client component will start processing. The first will be checking for existence of the "Biometrics" scanner (step 905). This is done by communicating using the "Biometrics" scanner specified protocol using the "Biometrics" scanner vendor supplied drivers.

If the "Biometrics" scanner was not present or connected or if there is any problem in communicating with the "Biometrics" scanner by the client component, the client component will immediately display an informative message 906 related to the cause of the communication problem.

The client component will also guide the user with the troubleshooting steps (if any) to rectify the communication problem. If the problem persists, the client component will immediately terminate the process by disconnecting itself from the server component. The server component, upon disconnection by the client component will terminate the process at the server and will redirect the web-browser to a web-page, from where the user will be guided.

If the "Biometrics" scanner was present, the client component will activate the scanner (step 907). All of the communications with scanner is done through the vendor supplier drivers and support software.

In case of fingerprint security, the user will be directed to place their finger on the scanner and, in other cases, the user will be directed to follow the steps provided based on the type of "biometrics" technology used.

When the "biometrics" data is successfully obtained from the user in step 908, then the client component will identify the unique physical or behavioral characteristics (step 909) and will convert them into binary data.

The client component will use the standard encryption method and compression (step 910), then the processed data will be sent to the invention's server component at the server.

The server component will validate the data sent and will compare the sent "biometrics" data with that stored in the database (step 911). The identification of the "biometrics" data in the database is done based on the unique identifier sent initially. If the comparison was not successful, the process will be terminated with an informative message (step 912). The error status will be returned to the application that called the invention's authentication program.

If the comparison was successful, the success status will be returned to the application that called the invention's authentication program for further actions. From steps 905 to 911, the connection between the server and the client component will be open. Any disconnection either by the client component or the server component will be taken as the termination of the process and the finalization procedures will be run for the processes in the server and the client. These include clearing of buffers, temporary areas, swap area and other operations as required.

The finalization procedure herein mentioned will also be executed during the successful completion of the process illustrated in FIG. 9.

Figure 10:
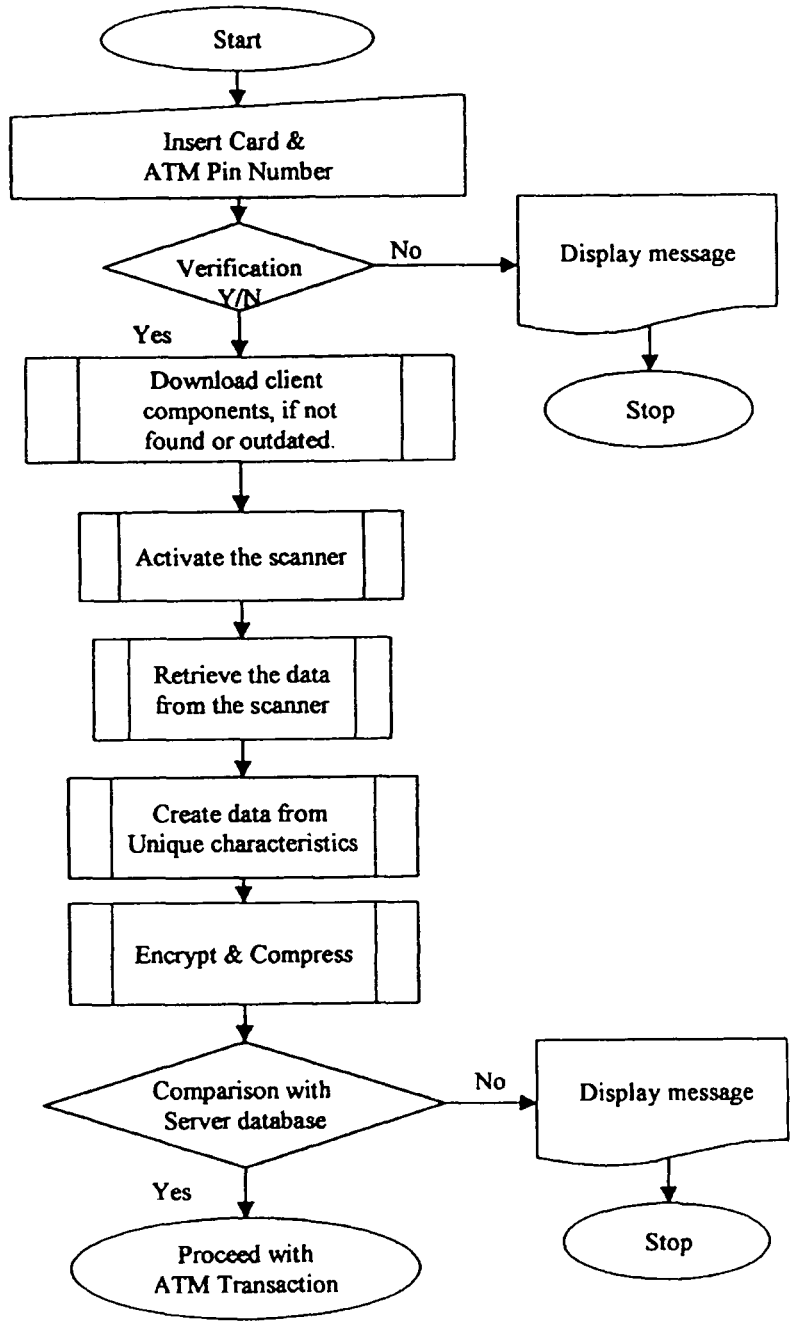
FIG. 10 is a flow diagram of the process for online authentication using biometrics in Internet Banking transactions.

FIG. 10, is a flow diagram of the process for online authentication using biometrics in an Internet banking transaction.

For this process, the "biometrics" data of the users must be enrolled using the process illustrated in FIGS. 1 and 3 based on the bank's unique identifier provided to their customer.

The web-site herein called, is the bank's web-site that facilitates its customer to do banking transaction online, also called "Internet banking."

This process is only the authentication process that validates the user. The actual Internet banking application is not illustrated here. This process may occur before or after the Internet banking process, based on the application design.

The basic requirement for this authentication process is the unique identifier that is generated or entered by the user. In this case, the user enters, the User Name/ID for example, that may be used as the identifier, and the "biometrics" data will be stored based on identifier, so that during verification the "biometrics" data is also selected using the identifier.

In this process, in step 1001, the user enters the identification details as required by the web-site.

The entered information will be validated by the web-site and, if the entered information is not valid, the process will be terminated immediately by displaying the message. This process is implemented by the web-site. The invention's role does not interfere yet.

The authentication process by the invention's program starts from step 1002, after the identification details provided by the user are validated. The invention's authentication program at the server is activated by providing the unique identifier that will be used for verification.

The process initiator for the invention's authentication program is the client software component, which is installed and used in step 1004.

The invention's authentication program will check for the existence of stored "biometrics" data (step 1002). If no data was stored for the unique identifier, then the process will be terminated with an informative message (step 1003).

The client components introduced in step 1004 of this process will be in the form of downloadable components (like ActiveX, Plug-in, Java Applets) that will be compatible with all of the available web-browsers, which is the main user-interface for the user. The versioning of the component will be maintained so that the web-browser will automatically download the latest components.

The execution of step 1004 is wholly taken care by the web-browser and the deployment of the components is made compatible for the same. In step 1004, all of the drivers and other necessary software components will be downloaded to the client PC.

From step 1005, the client component will start processing. The first will be checking for the existence of the "Biometrics" scanner (step 1005). This is done by communicating using the "Biometrics" scanner specified protocol using the "Biometrics" scanner vendor supplied drivers.

If the "Biometrics" scanner was not present or connected or if there is any problem in communicating with the "Biometrics" scanner by the client component, the client component will immediately display an informative message at step 1006 related to the cause of the communication problem.

The client component will also guide the user with the troubleshooting steps (if any) to rectify the communication problem. If the problem persists, the client component will immediately terminate the process by disconnecting itself from the server component. The server component, upon disconnection by the client component, will terminate the process at the server and will redirect the web-browser to a web-page, from where the user will be guided.

If the "Biometrics" scanner was present, the client component will activate the scanner (step 1007). All of the communications with the scanner is done through the vendor supplier drivers and support software.

In case of fingerprint security, the user will be directed to place their finger on the scanner and, in other cases, the user will be directed to follow the steps provided based on the type of "biometrics" technology used.

When the "biometrics" data is successfully obtained from the user in step 1008, then the client component will identify the unique physical or behavioral characteristics (step 1009) and will convert them into binary data.

The client component will use the standard encryption method and compression (step 1010), then the processed data will be sent to the invention's server component at the server.

The server component will validate the data sent and will compare the sent "biometrics" data with the one stored in the database (step 1011). The identification of the "biometrics" data in the database is done based on the unique identifier sent initially. If the comparison was not successful, the process will be terminated with an informative message (step 1012). The error status will be returned to the application in the web-site for further actions.

If the comparison was successful, the success status will be returned to the application in the web-site for further actions. From steps 1005 to 1011, the connection between the server and the client component will be open. Any disconnection either by the client component or the server component will be taken as the termination of the process and the finalization procedures will be run for the processes in the server and the client. These include clearing of buffers, temporary areas, swap area and other operations as required.

The finalization procedure herein mentioned will also be executed during the successful completion of the process illustrated in FIG. 10.

Figure 11:
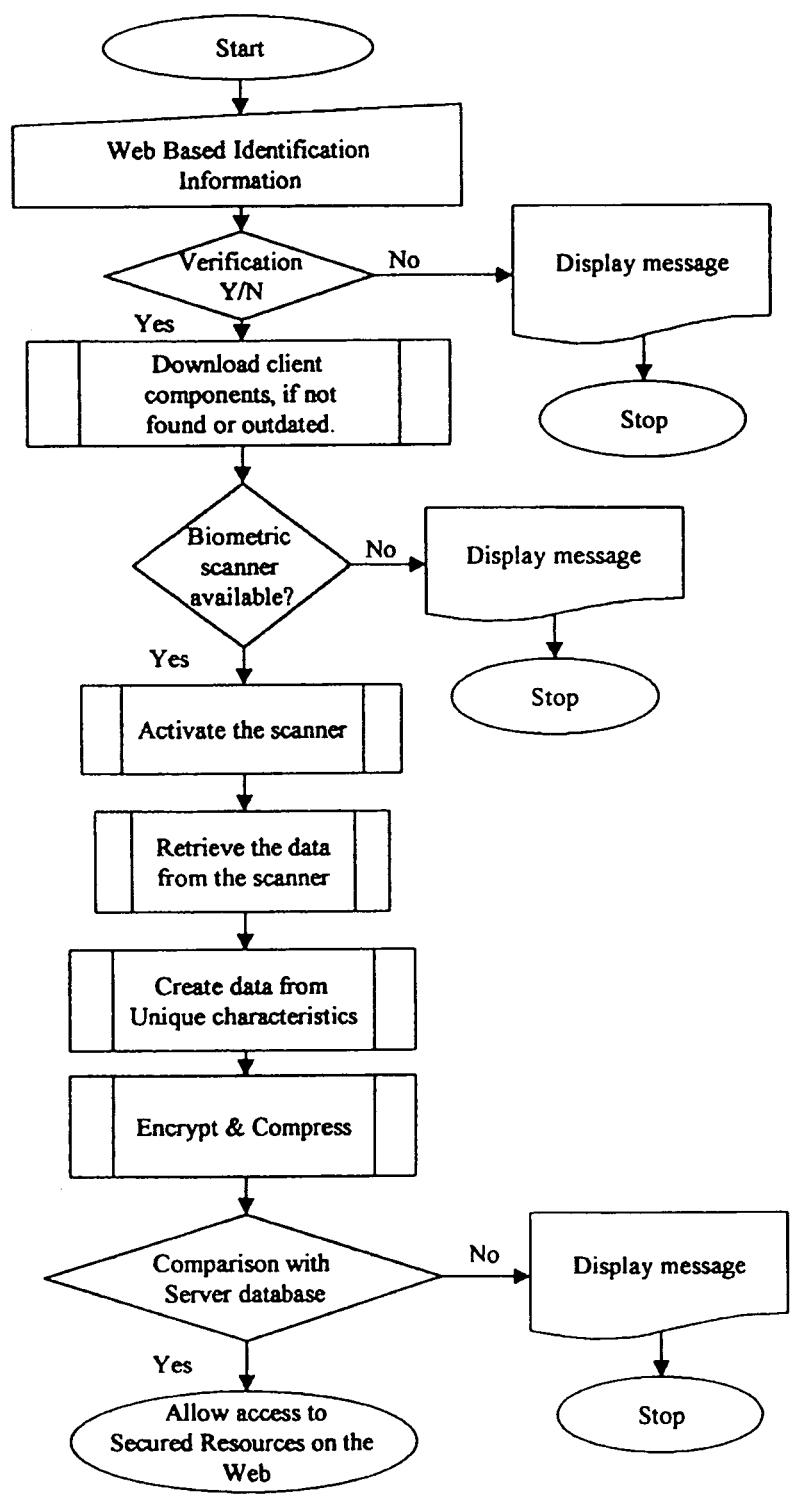
FIG. 11 is a flow diagram of the process for online authentication in software applications.

FIG. 11, is a flow diagram of the process for online authentication in software applications.

For this process, the "biometrics" data of the users must be enrolled using the process illustrated in FIGS. 1 and 3 based on the unique identifier used for identifying users in the application.

This process is only the authentication process that validates the user. The actual application is not illustrated here. This process may occur before or after the existing authentication process, based on the application design.

The basic requirement for this authentication process is the unique identifier that is generated or entered by the user. In this case, the user enters, the User Name/ID for example, that may be used as the identifier and the "biometrics" data will be stored based on the identifier, so that during verification the "biometrics" data is also selected using the identifier.

In this process, in step 1101, user enters the identification details as required by the application.

The entered information will be validated by the application, and if the entered information is not valid, the process will be terminated immediately by displaying the message. This process is implemented by the application, and the invention's role does not interfere yet.

The authentication process by the invention's program starts from step 1102, after the identification details provided by the user are validated. The invention's authentication program at the server is activated by providing the unique identifier that will be used for verification.

The process initiator for the invention's authentication program is the client software component, which is installed and used in step 1104.

The invention's authentication program will check for the existence of stored "biometrics" data (step 1102). If no data was stored for the unique identifier, then the process will be terminated with an informative message (step 1103).

The client components introduced in step 1104 of this process will be in form of downloadable components. The versioning of the component will be maintained so that the latest components will be downloaded automatically to the client PC.

In step 1104, all of the drivers and other necessary software components will be downloaded to the client PC.

From step 1105, the client component will start processing. The first will be checking for the existence of the "Biometrics" scanner (step 1105). This is done by communicating using the "Biometrics" scanner specified protocol using the "Biometrics" scanner vendor supplied drivers.

If the "Biometrics" scanner was not present or connected or if there is any problem in communicating with the "Biometrics" scanner by the client component, the client component will immediately display an informative message at step 1106 related to the cause of the communication problem.

The client component will also guide the user with the troubleshooting steps (if any) to rectify the communication problem. If the problem persists, the client component will immediately terminate the process by disconnecting itself from the server component. The server component, upon disconnection by the client component will terminate the process at the server.

If the "Biometrics" scanner was present, the client component will activate the scanner (step 1107). All of the communications with scanner is done through the vendor supplier drivers and support software.

In case of fingerprint security, the user will be directed to place their finger on the scanner and, in other cases, the user will be directed to follow the steps provided based on the type of "biometrics" technology used.

When the "biometrics" data is successfully obtained from the user in step 1108, then the client component will identify the unique physical or behavioral characteristics (step 1109) and will convert them into binary data.

The client component will use the standard encryption method and compression (step 1110), then the processed data will be sent to the invention's server component at the server.

The server component will validate the data sent and will compare the sent "biometrics" data with the one stored in the database (step 1111). The identification of the "biometrics" data in the database is done based on the unique identifier sent initially. If the comparison was not successful, the process will be terminated with an informative message (step 1112). The error status will be returned to the application for further actions.

If the comparison was successful, the success status will be returned to the application for further actions. From steps 1105 to 1111, the connection between the server and the client component will be open. Any disconnection either by the client component or the server component will be taken as the termination of the process and the finalization procedures will be run for the processes in the server and the client. These include clearing of buffers, temporary areas, swap area and other operations as required.

The finalization procedure herein mentioned will also be executed during the successful completion of the process illustrated in FIG. 11.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computerized security system for electronic commerce or for an electronic transaction for verifying the authenticity of a user comprising:
   a server authentication program for enrollment of biometrics data for a new user in a website of a web-server, or of a computing device, said server authentication program being installed in a computerized web-server or in at least one server or computing device;
   a client software component adapted to be downloaded via a web browser or a client software component installed and running on a network component used by the client and installed at a computerized workstation of the user;
   said server authentication program installed in the computerized web-server or the at least one server or computing device being integrated with existing web-applications with a web-service provider or with applications for electronic transactions over a network and for receiving existing security parameters entered by the user at the computerized workstation or of a computing device of the user;
   computerized system components for determining if entered security parameters of the user have been stored and wherein, if so, for determining if a biometric scanner is available to the user and wherein, if not, the client software component is adapted to disconnect the computerized workstation of the user from the web-server or the at least one server, and the web-server or the at least one server or computing device is adapted to terminate enrollment of biometrics data for the user and to redirect a web-browser or a server browser or the client application used by the client to a web-page or an interface to guide the user;
   a computerized client component for activating the biometric scanner for identifying characteristics of a biometrics image or data in addition to already received security parameters or without it and for converting the biometrics image into digital data;
   a computerized client component for compressing and encrypting the digital data from said biometric scanner or a computerized client component for getting the digital data from the biometric scanner;
   a computerized client component for transmitting the compressed and encrypted or plain data to the web-server or the at least one server or computing device geographically separate or near;
   a computerized server component for comparing the data with the data that has been previously stored in a database;
   a computerized server component for sending status of comparison in the form of-status codes or plain text or a coded language understood by the program or a human, if comparison is successful, to the web-service or the at least one server or computing device; and a computerized server component for running finalization procedures, including clearing of buffers in the computerized workstation and the computerized web-server or the at least one server or computing device, when a successful comparison has been made or when a computerized workstation or the computerized web-server or the at least one server or computing device is disconnected.

2. The computerized security system for electronic commerce for verifying the authenticity of a user as claimed in claim 1, wherein the biometrics image is selected from one or more of the group consisting of a finger print of one or more fingers of the user, a palm print of the user, an iris scan of the user, a retina scan of the user and another optically distinguishable parameter of the user.

3. The computerized security system for electronic commerce for verifying the authenticity of a user as claimed in claim 1, wherein a plurality of sources of biometric data of a single user is used to authenticate the identity of the user.

4. The computerized security system of claim 1, further comprising:
a computerized server component for downloading the client software component on the computerized user workstation and for updating the client software component on the computerized user workstation.

5. The computerized security system of claim 1, further comprising:
a computerized server component for disconnecting a computerized client component from the computerized web-server or from the at least one server or computing device and directing the user to a web-page with instructions to follow to re-establish the connection.

6. A method of verifying the authenticity of a user with a computerized security system for electronic commerce or for an electronic transaction that takes place in a computer, comprising the steps of:
installing a server authentication program in a computerized web-server or in at least one server or computing device, said server authentication program or similar authentication program for a website of a web-server or of a server or computing device;
downloading and installing a client software component at a computerized workstation of the user to permit entry of user security parameters or running without it;
integrating said server authentication program with existing web-applications with a web-service provider or with applications for electronic transactions that take place in a computer or computing device;
receiving existing security parameters entered by the user at the computerized workstation;
determining if the received security parameters of the user have been previously received and, wherein if so, determining if a biometric scanner is available to the user and wherein, if not, disconnecting the computerized workstation or computing device of the user from the web-server or the at least one server or computing device, terminating enrollment of biometrics data for the user, and redirecting a web-browser or a server browser used by the client to a web-page or to an interface to guide the user;
activating a biometric scanner available to the user to identify characteristics of a biometrics image in addition to already received security parameters and to convert the biometrics image into digital data;
compressing and encrypting the digital data from said biometric scanner or proceeding without compressing or without encryption;
transmitting the compressed and encrypted data or plain data to the computerized web-server or to the at least one server or computing device;
comparing the compressed and encrypted data or plain data transmitted to the computerized web-server or to the at least one server or computing device with compressed and encrypted data or plain data that has been previously stored in a computerized database;
sending status codes of comparison or codes required for identification, if comparison is successful, to the computerized web-service or the at least one server or computing device; and
running finalization procedures, including clearing of buffers in the computerized workstation or computing device and the computerized web-server or the at least one server or computing device, when a successful comparison has been made or when a computerized workstation or computing device or the computerized web-server or the at least one server or computing device is disconnected.

7. The method of verifying the authenticity of a user with the computerized security system for electronic commerce as claimed in claim 6, further comprising the step of selecting the biometrics data from one or more of the group consisting of a finger print of one or more fingers of the user, a palm print of the user, an iris scan of the user, and a retina scan of the user.

8. The method of verifying the authenticity of a user with the computerized security system for electronic commerce as claimed in claim 6, further comprising the step of using a plurality of sources of biometric data of a single user to authenticate the identity of the user.

* * * * *